US012437562B2

United States Patent
Padmanaban et al.

(10) Patent No.: US 12,437,562 B2
(45) Date of Patent: Oct. 7, 2025

(54) SYSTEM AND METHOD FOR INCREASING A RESOLUTION OF A THREE-DIMENSION (3D) IMAGE

(71) Applicant: Bank of America Corporation, Charlotte, NC (US)

(72) Inventors: Ravindran Padmanaban, Chennai (IN); Srinivasan Selvaraj, Chennai (IN)

(73) Assignee: Bank of America Corporation, Charlotte, NC (US)

(*) Notice: Subject to any disclaimer, the term of this patent is extended or adjusted under 35 U.S.C. 154(b) by 405 days.

(21) Appl. No.: 18/171,921

(22) Filed: Feb. 21, 2023

(65) Prior Publication Data
US 2024/0282125 A1   Aug. 22, 2024

(51) Int. Cl.
G06V 20/64  (2022.01)
G06T 7/73   (2017.01)
G06T 17/20  (2006.01)
G06T 19/20  (2011.01)
(Continued)

(52) U.S. Cl.
CPC ............ *G06V 20/647* (2022.01); *G06T 7/73* (2017.01); *G06T 17/205* (2013.01); *G06T 19/20* (2013.01); *G06V 10/44* (2022.01); *G06V 10/7715* (2022.01); *G06T 2210/36* (2013.01);
(Continued)

(58) Field of Classification Search
CPC .......... G06T 7/73; G06T 17/00; G06T 17/20; G06T 17/205; G06T 2210/03; G06T 2219/201; G06T 2219/2012; G06V 10/44; G06V 10/7715; G06V 20/647
See application file for complete search history.

(56) References Cited

U.S. PATENT DOCUMENTS 7,835,568 B2   11/2010   Park et al.
8,861,800 B2   10/2014   Savvides et al.
9,142,019 B2    9/2015   Lee
(Continued)

OTHER PUBLICATIONS

Goswami et al. "RGB-D Face Recognition With Texture and Attribute Features," in IEEE Transactions on Information Forensics and Security, vol. 9, No. 10, pp. 1629-1640, Oct. 2014, doi: 10.1109/TIFS.2014.2343913. Accessed via <https://ieeexplore.ieee.org/abstract/document/6868224> on May 28, 2025. (Year: 2014).*

*Primary Examiner* — John Villecco
*Assistant Examiner* — Joshua B. Crockett

(57) ABSTRACT

A system for increasing a resolution of a three-dimension (3D) image determines contours of a 3D image. The system determines a mesh image vector, where the mesh image vector indicates location coordinates of feature points on a surface of an object in the 3D image. The system compares the mesh image vector with each contour. The system determines an intersecting feature point where the mesh image vector meets a contour. The system determines that a baseline dataset includes a first feature point that corresponds to the intersecting feature point. In response, the system generates a structural vector by populating the structural vector with the intersecting feature point. The system determines a color code associated with the intersecting feature point and generates a textural vector by populating the textural vector with the color code. The system generates an image vector by combining the structural vector and the textural vector.

20 Claims, 3 Drawing Sheets

(51) Int. Cl.
  *G06V 10/44* (2022.01)
  *G06V 10/77* (2022.01)
(52) U.S. Cl.
  CPC ............. *G06T 2219/2012* (2013.01); *G06T 2219/2016* (2013.01)

(56) References Cited

U.S. PATENT DOCUMENTS

| | | |
|---|---|---|
| 10,043,308 B2 | 8/2018 | Zhang et al. |
| 10,192,135 B2 | 1/2019 | Krenzer et al. |
| 10,602,126 B2 | 3/2020 | Rowell et al. |
| 10,650,539 B2 | 5/2020 | Yan et al. |
| 10,671,838 B1 | 6/2020 | Bogan, III et al. |
| 10,796,480 B2 | 10/2020 | Chen et al. |
| 11,036,968 B2 | 6/2021 | Shi et al. |
| 11,049,271 B2 | 6/2021 | Xu et al. |
| 11,238,270 B2 | 2/2022 | Xiao et al. |
| 11,257,289 B2 | 2/2022 | Venkataraman |
| 11,308,675 B2 | 4/2022 | Wang et al. |
| 11,488,359 B2 | 11/2022 | Goodrich et al. |
| 2002/0050988 A1* | 5/2002 | Petrov .................. G06V 10/10 345/418 |
| 2016/0325755 A1 | 11/2016 | Ricci |
| 2019/0362551 A1* | 11/2019 | Sheffield .............. G06T 17/205 |
| 2020/0026906 A1 | 1/2020 | Ajiki et al. |
| 2020/0058153 A1 | 2/2020 | Ouyang |
| 2021/0065454 A1 | 3/2021 | Goodrich et al. |
| 2024/0029353 A1* | 1/2024 | Wang ..................... G06T 17/20 |

\* cited by examiner

SYSTEM AND METHOD FOR INCREASING A RESOLUTION OF A THREE-DIMENSION (3D) IMAGE

TECHNICAL FIELD

The present disclosure relates generally to image processing, and more specifically to a system and method for increasing a resolution of a three-dimension (3D) image.

BACKGROUND

Two-dimension (2D) images are used for object detection, identification, and validation. 2D images can only provide limited information about the features of an object from one view and lack providing information from other views or perspectives. For example, a 2D image of an object from the top view may not provide sufficient information about the physical attributes of the object from other angles.

SUMMARY

The system described in the present disclosure is particularly integrated into a practical application of increasing a resolution of three-dimension (3D) images from an input 3D image that has a lower resolution. For example, the disclosed system is configured to identify and add additional data points to the existing data points associated with the surface of the object shown in the 3D image. The additional data points provide additional information about the structure and texture of the object that is not present in the input 3D image. This, in turn, provides an additional practical application for improving object detection, identification, and validation. For example, in response to increasing the resolution or the number of feature data points of a 3D image of an object, the 3D model of the object may provide a more accurate reference for the detection, identification, and validation of the object. These practical applications may be deployed in various technologies, such as user (or generally object) detection, identification, and validation, generating more realistic avatars that closely resemble respective users for, e.g., virtual environment applications, among others. These practical applications lead to the technical advantage of improving information security technology. For example, if a 3D image of a counterfeit object is presented for validation, the disclosed system is able to detect that the object is counterfeit by comparing the provided 3D image of the counterfeit object with a 3D image of the authentic object and determining that the physical features of the counterfeit object do not correspond to the physical attributes of the authentic object.

Certain embodiments provide technical improvements to the current object detection, identification, and validation technology and image processing technology. The present disclosure contemplates a system and a method to increase the resolution of 3D images of objects. In the current technology, 2D images are used for object detection, identification, and validation. However, 2D images can only provide information or feature about an object from one plane (e.g., xy plane) and lack providing information from other angles, perspectives, or planes in the 3D space. For example, a contour from the top-view of an object may not provide sufficient information about the physical attributes of the object from other angles. Therefore, object identification from 2D images is not accurate because it relies on limited features extracted from the 2D image from one plane and does not provide information about the depth of the object. Using 3D images for object detection, identification, and validation is computationally complex and challenging. Generating a 3D model of an object requires a lot of processing and memory resources. If not modeled correctly, the 3D image of the object would not be useful for accurate object detection, identification, and validation.

The disclosed system is configured to generate a high-resolution 3D model of an object based on a lower-resolution 3D image of the object. For example, the disclosed system may determine additional feature points where a mesh image vector (that represents feature points on the surface of the object as shown in the 3D image) meets a contour associated with the object shown in the 3D image. The disclosed system may determine the additional feature points by comparing the mesh image vector with each of a set of contours determined in different planes (e.g., xy plane, yz plane, and zx plane). In this manner, the disclosed system provides technical advantages, practical applications, and technical improvements to object detection, identification, and validation technology and 3D image processing technology.

In certain embodiments, a system for increasing a resolution of a 3D image comprises a memory operably coupled with a processor. The memory is configured to store a baseline dataset and a first 3D image of a first object. The baseline dataset comprises a first set of feature points that are known for a first category of objects, where the first set of feature points indicates physical attributes that are common among the first category of objects. The baseline dataset further comprises a color code associated with each of the set of feature points. The first 3D image belongs to the first category of objects. The processor is configured to determine a set of contours from the first 3D image, where each of the set of contours represents a boundary around the first object in a different two-dimension (2D) plane. The processor is further configured to determine a mesh image vector that indicates a set of location coordinates of a second set of feature points on the surface of the first object, where the second set of feature points indicates the physical attributes of the first object. For at least a first contour from among the set of contours, the processor is further configured to compare the mesh image vector with the first contour and determine an intersecting feature point where the mesh image vector meets the first contour. The processor is further configured to determine that the baseline dataset comprises a first feature point that corresponds to the intersecting feature point. In response to determining that the baseline dataset comprises the first feature point that corresponds to the intersecting feature point, the processor is further configured to generate a structural vector by populating the structural vector with the intersecting feature point. The processor is further configured to determine a first color code associated with the intersecting feature point based at least in part upon determining that the first feature point is associated with the first color code. The processor is further configured to generate a textural vector by populating the textural vector with the first color code. The processor is further configured to generate an image vector of the first object by combining the structural vector with the textural vector. The processor is further configured to access a test 3D image of a second object. The processor is further configured to extract a set of features from the test 3D image, wherein the set of features represents the physical attributes of the second object shown in the test 3D image. The processor is further configured to compare the image vector of the first object to the extracted set of features. The processor is further configured to determine that the first object is the second object in response to determining that more than a threshold percentage of feature points of the image vector corresponds to counterpart features of the extracted set of features.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
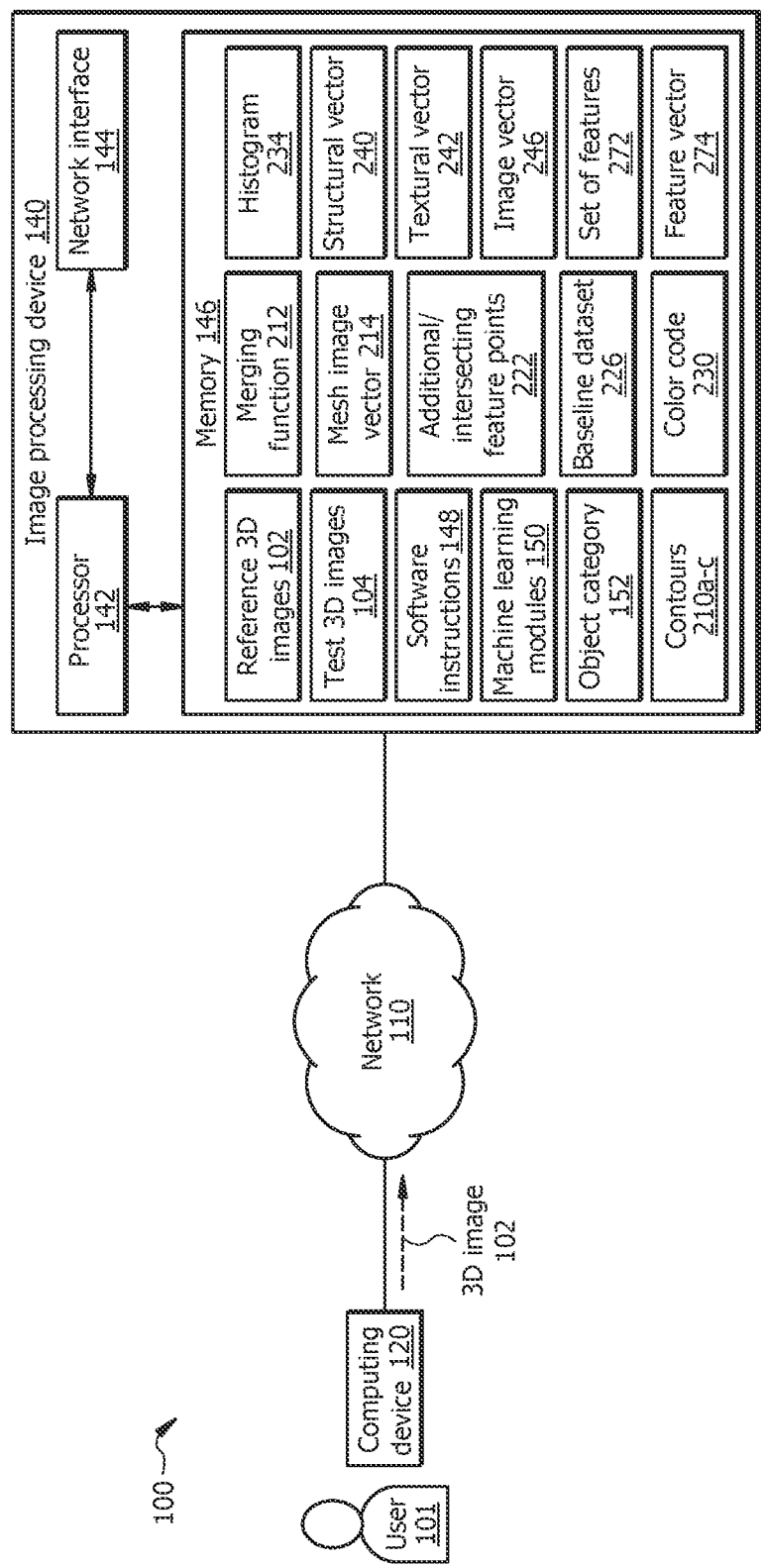
FIG. 1 illustrates an embodiment of a system configured to increase a resolution of a three-dimension (3D) image.
Figure 2:
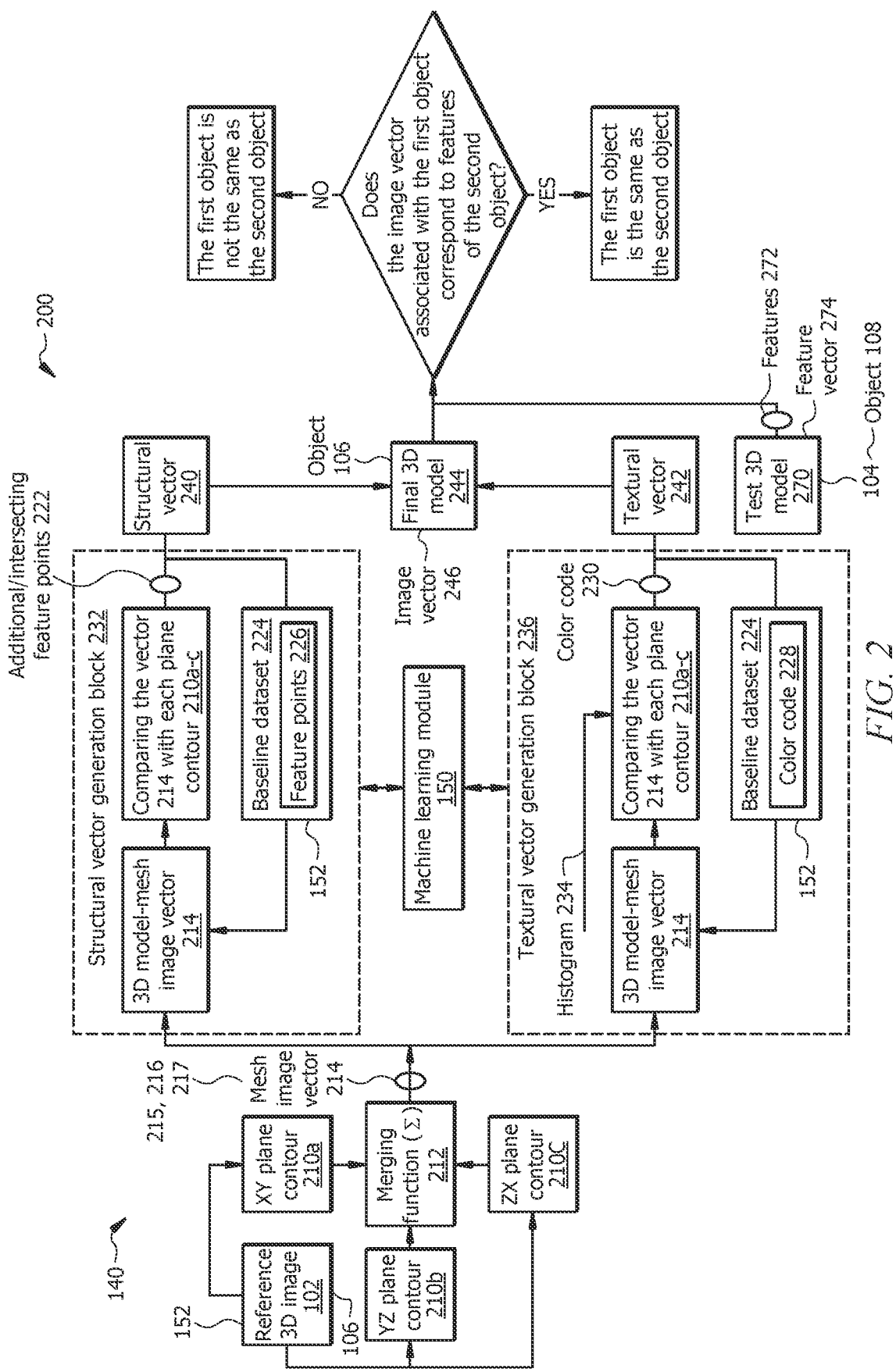
FIG. 2 illustrates an example operational flow of the system of FIG. 1.
Figure 3:
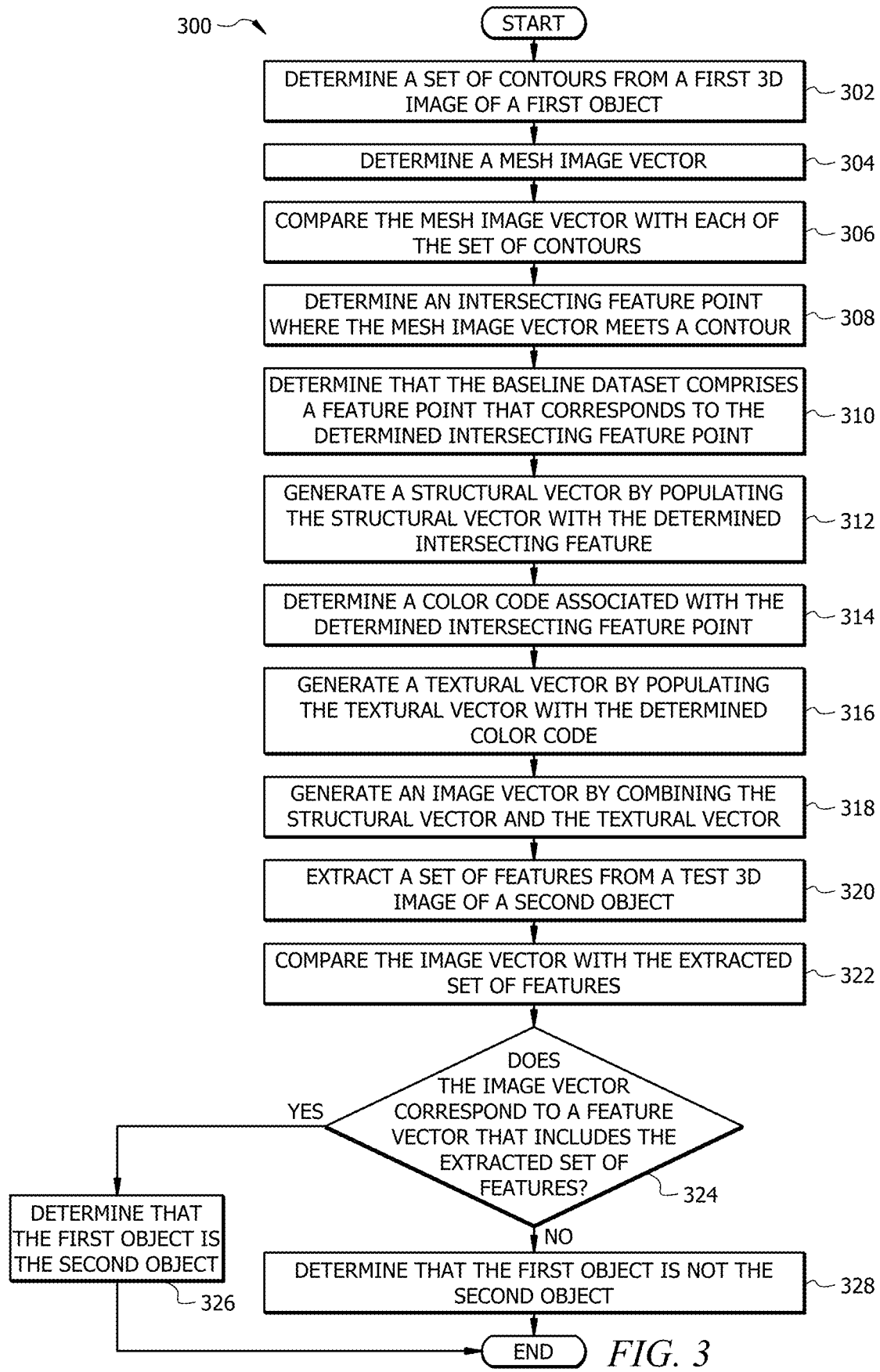
FIG. 3 illustrates an example flowchart of a method for increasing a resolution of a 3D image.

As described above, previous technologies fail to provide efficient and reliable solutions to increase a resolution of a three-dimension (3D) image or provide improved object detection, identification, and validation. Embodiments of the present disclosure and its advantages may be understood by referring to FIGS. 1 through 3. FIGS. 1 through 3 are used to describe systems and methods to increase the resolution of 3D images and use the high-resolution 3D image for object detection, identification, and validation.

System Overview

FIG. 1 illustrates an embodiment of a system 100 that is generally configured to implement a contour-based image segmentation in a three-dimension (3D) plane and provide a higher-resolution 3D model of an image. In certain embodiments, the system 100 comprises an image processing device 140 communicatively coupled to one or more computing devices 120 via a network 110. Network 110 enables communications among the components of system 100. The computing device 120 may communicate 3D images 102 to the image processing device 140 for processing. The image processing device 140 comprises a processor 142 in signal communication with a memory 146. Memory 146 stores software instructions 148 that when executed by the processor 142 cause the image processing device 140 to perform one or more operations described herein. In other embodiments, system 100 may not have all of the components listed and/or may have other elements instead of, or in addition to, those listed above.

In general, the system 100 improves object detection, identification, and validation by providing higher-resolution and more detailed 3D images of objects. In the current technology, 2D images are used for object detection, identification, and validation. However, 2D images can only provide information or feature about an object from one plane (e.g., xy plane) and lack providing information from other angles, perspectives, or planes. For example, a contour from the top view of an object may not provide sufficient information about the physical attributes of the object from other angles. Therefore, object identification from 2D images is not accurate because it relies on details and features extracted from the 2D image from one plane and does not provide information about the depth of the object. Using 3D images for object detection, identification, and validation is computationally complex and challenging. Generating a 3D model of an object requires a lot of processing and memory resources. If not modeled correctly, the 3D image of the object would not be useful for accurate object detection, identification, and validation.

The system 100 is configured to generate a high-resolution 3D model of an object based on a lower-resolution 3D image of the object. In certain embodiments, the generates 3D image may be used in various applications, such as virtual objects in virtual environments, facial recognition, and the like. Thus, the system 100 may provide technical advantages, practical applications, and technical improvements to image processing technology and object detection, identification, and validation technology. These practical applications may be deployed in various technologies, such as user (or generally object) detection, identification, and validation, generating more realistic avatars that closely resemble respective users for, e.g., virtual environment applications, among others. These practical applications lead to the technical advantage of improving information security technology. For example, if a 3D image of a counterfeit object is presented for validation, the disclosed system is able to detect that the object is counterfeit by comparing the provided 3D image of the counterfeit object with a 3D image of the authentic object and determining that the physical features of the counterfeit object do not correspond to the physical attributes of the authentic object.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users 101. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, keypad, or other appropriate terminal equipment usable by user 101. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. For example, the computing device 120 may communicate a 3D image 102 to the image processing device 140 via the network 110 in response to a command from the user 101, e.g., when the user 101 initiates the transmission of the 3D image 102 to the image processing device 140.

Image Processing Device

Image processing device 140 generally includes a hardware computer system configured to process images (e.g., reference 3D images 102 and test 3D images 104), and generate a high-resolution 3D model of the object 106 (see FIG. 2) shown in the reference 3D image 102. In other words, the image processing device 140 may be configured to increase the resolution of the mesh model of a given 3D image 102. For example, the image processing device 140 may increase the resolution of the mesh model of the given 3D image 102 by detecting additional feature points 222 that are intersecting between a mesh image vector 214 and each contour 201*a*-*c* around the object in different planes. The image processing device 140 may also be configured to determine whether the first object 106 shown in a reference 3D image 102 corresponds to or matches a second object shown in a test 3D image 104. These operations are described in more detail in FIG. 2.

In certain embodiments, the image processing device 140 may be implemented by a cluster of computing devices, such as virtual machines. For example, the image processing device 140 may be implemented by a plurality of computing devices using distributed computing and/or cloud computing systems in a network. In certain embodiments, the image processing device 140 may be configured to provide services and resources (e.g., data and/or hardware resources, such as the high-resolution 3D model of an object) to other components of the system 100.

The image processing device 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the image processing device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 as described in FIG. 2 and one or more operations of method 300 as described in FIG. 3.

Network interface 144 is configured to enable wired and/or wireless communications. The network interface 144 may be configured to communicate data between the image processing device 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-4 along with any other data, instructions, logic, rules, or code operable to implement the function(s) described herein when executed by processor 142. For example, the memory 146 may store software instructions 148, reference 3D images 102, machine learning module 150, object category 152, contours 210*a*-*c*, mesh image vector 214, additional/intersecting feature points 222, structural vector 240, textural vector 242, color code 230, baseline dataset 226, merging function 212, test 3D images 104, set of features 271, image vector 246, feature vector 274, histogram 234, and/or any other data or instructions. The software instructions 148 may comprise any suitable set of instructions, logic, rules, or code operable to execute the processor 142 and perform the functions described herein, such as some or all of those described in FIGS. 1-4.

The reference 3D image 102 may be a 3D image of an object. Examples of the object may be a person, a dog, a cat, a tree, a vehicle, a building, or any other object. The reference 3D image 102 may also be referred to herein as a reference image. The test 3D image 104 may be a 3D image of a test object. For example, for object detection, identification, and validation, the image processing device 140 may compare a 3D model of the reference image 102 with a set of features 272 extracted from the test 3D image 104. The test 3D image 104 may be referred to herein as a test image.

Machine learning module 150 may be implemented by the processor 142 executing the software instructions 148, and is generally configured to facilitate the operations of the image processing device 140 described herein. For example, the machine learning module 150 may be configured to determine a set of contours 210a-c from the reference image 102, detect a mesh image vector 214 from the contours 210a-c, compare the mesh image vector 214 with each contour 210a-c, detect intersecting feature points 222 based on the comparison, compare the detected intersecting/additional feature points 222 with the baseline dataset 224, generate a structural vector 240 by adding or populating the structural vector 240 with the detected intersecting/additional feature point 222, detect color code 230 of the intersecting/additional feature points 222, generate a textural vector 242 by adding or populating the textural vector 242 with detected color code 230 of the intersecting/additional feature points 222, and generate an image vector 246 of the object 106 (see FIG. 2) by combining the structural vector 240 and the textural vector 242. These operations are described in greater detail in FIG. 2.

In certain embodiments, the machine learning module 150 may include a soft computing for real-time learning and classification algorithm, a fast adaptive neural network classifier, and the like. In certain embodiments, the machine learning module 150 may include a support vector machine, neural network, random forest, k-means clustering, Tree-based algorithm, Random Forest algorithm, etc. In certain embodiments, the machine learning module 150 may be implemented by a plurality of neural network layers, convolutional neural network layers, Long-Short-Term-Memory (LSTM) layers, Bi-directional LSTM layers, recurrent neural network layers, and the like. The machine learning module 150 may be implemented by supervised, semi-supervised, or unsupervised training algorithms.

Operational Flow for Increasing the Resolution of a 3D Image by Detecting Additional Feature Points FIG. 2 illustrates an example operational flow 200 of the system 100 of FIG. 1 for increasing the resolution of a reference image 102 by detecting additional feature points 222 in addition to the existing feature points 216 associated with mesh image vector 214 and the reference image 102, and generating a high resolution 3D model 244 of the object 106 shown in the reference image 102.

The operational flow 200 may begin when the image processing device 140 receives or accesses the reference image 102. For example, the image processing device 140 may receive the reference image 102 when the user 101 sends the reference image 102 to the image processing device 140 from the computing device 120 (see FIG. 1). The reference image 102 (i.e., the first image 102) may show a first object 106. The first object 106 may belong to a first object category 152, e.g., faces of people, dogs, cats, animals, trees, etc.

Determining a Mesh Image Vector

In response to accessing the reference image 102, the image processing device 140 may extract or determine a set of contours 210a-c from the reference image 102. Each of the set of contours 210a-c may represent or show a boundary around the first object in a different 2D plane. For example, the first contour 210a (e.g., an xy plane contour 210a) may represent a first boundary around the first object in the xy plane, the second contour 210b (e.g., a yz plane contour 210b) may represent a second boundary around the first object in the yz plane, and the third contour 210c (e.g., a zx plane contour 210c) may represent a third boundary around the first object in the zx plane. Each set of contours 210a-c may be represented by a vector comprising numerical values that may indicate the location coordinates of pixels on the boundaries or edges of the first object. In certain embodiments, the image processing device 140 may determine the contours 210a-c based on locations of pixels at the boundaries or edges of the first object 106 shown in the reference image 102.

In certain embodiments, the image processing device 140 may determine a plurality of contours 210a-c at different depths of the reference image 102 from the perspective of each 2D plane. For example, the contours 210a-c may include a plurality of contours 210a that represent boundaries around the first object 106 at different depths from the perspective of the xy plane (e.g., with different values of z, such as z=0, 1, 1.1, 1.2, −1, −1.1, −1.2, etc.), a plurality of contours 210b that represent boundaries around the first object 106 at different depths from the perspective of the yz plane (e.g., with different values of x=0, 1, 1.1, 1.2, −1, −1.1, −1.2, etc.), and a plurality of contours 210c that represent boundaries around the first object 106 at different depths from the perspective of the zx plane (e.g., with different values of y, such as z=0, 1, 1.1, 1.2, −1, −1.1, −1.2, etc.).

The image processing device 140 may determine the mesh image vector 214 from the set of contours 210a-c. In this operation, the image processing device 140 may feed the set of contours 210a-c to a merging function 212. The merging function 212 may be implemented by the processor 142 (see FIG. 1) executing the software instructions 148 (see FIG. 1), and generally configured to merge, combine, append, or superimpose the set of contours 210a-c together. The output of the merging function 212 may be the mesh image vector 214. The mesh image vector 214 may include a set of numerical values that represent the merged set of contours 210a-c.

The mesh image vector 214 may indicate a set of location coordinates 215 of a set of feature points 216 on the surface of the first object 106. The set of feature points 216 may indicate physical attributes of the first object, such as shapes, edges, and dimensions of different portions of the first object 106 as shown in the reference image 102.

In certain embodiments, the image processing device 140 may determine the mesh image vector 214 by merging a set of vectors that represents the set of contours 210a-c with each other.

Determining a Structural Vector

The image processing device 140 (e.g., via the machine learning module 150) may perform the operations described with respect to the structural vector generation block 232 to generate the structural vector 240. To this end, the image processing device 140 may feed the mesh image vector 214 to the machine learning module 150.

In certain embodiments, the image processing device 140 (e.g., via the machine learning module 150) may process the mesh image vector 214, the contours 210a-c, and the baseline dataset 224 to determine the structural vector 240. In this operation, the image processing device 140 may compare the mesh image vector 214 with each of the contours 210a-c to determine the differences and commonalities between them in terms of lines, shapes, and edges. Based on each comparison, in certain embodiments, the image processing device 140 may determine one or more intersecting feature points 222 that are in the intersection region(s) or intersection point(s) where the mesh image vector 214 meets each respective contour 210a-c. For example, with respect to the first contour 210a, the mesh image vector 214 may be compared with the first contour 210a, and one or more intersecting feature points 222 where the mesh image vector 214 meets the first contour 210a may be detected or determined. Similarly, with respect to the second contour 210b, the mesh image vector 214 may be compared with the second contour 210b, and one or more intersecting feature points 222 where the mesh image vector 214 meets the second contour 210b may be detected or determined, and with respect to the third contour 210c, the mesh image vector 214 may be compared with the third contour 210c, and one or more intersecting feature points 222 where the mesh image vector 214 meets the third contour 210c may be detected or determined.

In certain embodiments, each comparison may be at various depths from the perspective of each respective contour 210a-c. For example, for comparison with the first contour 210a, a plurality of xy plane contours 210a with different values of z along the z-axis may be determined and the mesh image vector 214 may be compared with each of the plurality of xy planes contours 210a. A similar operation may apply to comparing with other contours 210b and 210c. Therefore, the mesh image vector 214 may be compared to a plurality of xy plane contours 210b with different z values along the z-axis, a plurality of yz plane contours 210b with different x values along the x-axis, and a plurality of zx plane contours 210c with different y values along the y axis. One or more intersecting feature points 222 where the mesh image vector 214 meets each contour 210a-c may be determined.

In certain embodiments, the mesh image vector 214 may be compared with each of the planes (e.g., xy plane, yz plane, and zx plane). Based on each comparison, in certain embodiments, the image processing device 140 may determine one or more intersecting feature points 222 that are in the intersection region(s) or intersection point(s) 222 where the mesh image vector 214 meets each respective plane. In certain embodiments, each comparison may be at various depths from the perspective of each respective plane. For example, for comparison with the xy plane, a plurality of xy planes with different values of z (e.g., z=0, 1, 1.1, 1.2, −1, −1.1, −1.2, etc.) may be determined and the mesh image vector 214 may be compared with each of the plurality of xy planes. A similar operation may apply to other planes. Therefore, the mesh image vector 214 may be compared to a plurality of xy planes with different z values, a plurality of yz planes with different x values, and a plurality of zx planes with different y values. One or more intersecting feature points 222 where the mesh image vector 214 meets each plane may be determined.

The image processing device 140 may compare the output of the comparison operation with the baseline dataset 224 which belongs to the same object category 152 as the reference image 102. The baseline dataset 224 may include a set of feature points 226 that are known for the particular object category 152. For example, if the particular object category 152 is the faces of people, the set of feature points 226 may be feature points that are common among the faces of people. In other words, in the example of faces of people, the set of feature points may represent a "skeleton", baseline structure, or reference points that form or align with the faces of people. The set of feature points 226 may indicate physical attributes that are common among the particular object category 152. The baseline dataset 224 may also include a set of color code 228 or color pallet code 228 associated with the set of feature points 226, where each color code 228 or color pallet code 228 is associated with a respective feature point 226. The set of color code 228 or color pallet code 228 may be known for different regions of objects in the object category 152. For example, in the example of trees as an object category 152, the color code/pallet code 228 of pixels or feature points associated with the leaves of the tree may be a green color pallet code, the color code/pallet code 228 of pixels or feature points associated with the body of the tree may be a brown color pallet code, etc.

In certain embodiments, the image processing device 140 may use the baseline dataset 224 as a reference or feedback signal to determine whether the determined intersecting/additional feature points 222 correspond to or within a threshold distance from a known feature point 226 from the baseline dataset 224. The baseline dataset 224 may provide recommendations as to which intersecting/additional feature points 222 are more accurate or aligned with the structure of the object shown in reference image 102 so they can be added to the final 3D model of the object 106. To this end, the image processing device 140 may compare a determined intersecting/additional feature point 222 with each feature point 226. In this process, the image processing device 140 may determine whether there is any neighboring feature point 226 that is within a threshold distance (e.g., 0.1, 0.2, etc. millimeters) from each determined intersecting/additional feature point 222. If it is determined that at least one neighboring feature point 226 is within the threshold distance from the determined intersecting/additional feature point 222, the image processing device 140 may determine that the intersecting/additional feature point 222 should be added to the structural vector 240. Otherwise, in some embodiments, it may be determined that the intersecting/additional feature point 222 should not be added to the structural vector 240. In some embodiments, it may be determined that the intersecting/additional feature point 222 be added to the structural vector 240 even if the intersecting/additional feature point 222 does not correspond to a feature point 226.

In certain embodiments, if it is determined that at least one neighboring feature point 226 is within the threshold distance from the determined intersecting/additional feature point 222, the image processing device 140 may determine that the intersecting/additional feature point 222 corresponds to the counterpart feature point 226. In response, the image processing device 140 may generate the structural vector 240 by adding or populating the structural vector 240 with the determined intersecting/additional feature points 222. For example, the image processing device 140 may generate an empty vector 240 and populate it with the already existing feature points 216 as indicated by the mesh image vector 214 and the reference image 102 and in each iteration of the loop illustrated in the structural vector generation block 232 add newly identified additional/intersecting feature points 222 to the structural vector 240. The structural vector 240 may represent a "skeleton", lines, edges, and shapes of different regions of the object shown in the reference image 102 with the added intersecting/additional feature points 222. The structural vector 240 may provide information about the physical "skeleton", lines, edges, and shapes of different regions of the object 106 (e.g., the feature points 216) with the added intersecting/additional feature points 222. The structural vector 240 may not include information about the colors of the different regions of the object 106. The colors of the different regions of the object 106 are determined by performing the operations described in conjunction with the textural vector generation block 236, similar to that described below.

Determining a Textural Vector

The image processing device 140 (e.g., via the machine learning module 150) may use the information obtained from the operations performed in conjunction with the structural vector generation block 232 to determine the textural vector 242, and vice versa. For example, each iteration of loops shown in blocks 232 and 236 may be synchronized and information determined from each loop may be used to determine or update the output of the other loop.

The image processing device 140 (e.g., via the machine learning module 150) may perform the operations described with respect to the textural vector generation block 236 to determine the textural vector 242. In this process, the image processing device 140 may feed the mesh image vector 214 to the machine learning module 150. In certain embodiments, the image processing device 140 (e.g., via the machine learning module 150) may process the mesh image vector 214, the contours 210*a-c*, and the baseline dataset 224 to determine the textural vector 242. In this process, the image processing device 140 may compare the mesh image vector 214 with each of the plane contours 210*a-c* to determine the differences and commonalities between them in terms of color code in different regions/pixels/feature points. Based on each comparison, in certain embodiments, the image processing device 140 may determine a color code 230 that is associated with the corresponding determined intersecting/additional feature point 222 based on determining that the feature point 226 (that is determined to correspond to the intersecting/additional feature point 222) is associated with the color code 230. Similarly, a set of color code 230 may be determined from the comparison operations to be associated with the corresponding determined intersecting/additional feature points 222 based on determining that each feature point 226 is associated with a respective color code 230. For example, in response to determining each additional feature point 222, it may be used to determine the color code 230 of each additional feature point 222. For example, with respect to the first contour 210*a*, the mesh image vector 214 may be compared with the first contour 210*a*, and color code 230 of the additional feature points 222 where the mesh image vector 214 meets the first contour 210*a* may be detected or determined. Similarly, with respect to the second contour 210*b*, the mesh image vector 214 may be compared with the second contour 210*b*, and color code 230 of the additional feature points 222 where the mesh image vector 214 meets the second contour 210*b* may be detected or determined, and with respect to the third contour 210*c*, the mesh image vector 214 may be compared with the third contour 210*c*, and color code 230 of the additional feature points 222 where the mesh image vector 214 meets the third contour 210*c* may be detected or determined.

In certain embodiments, each comparison may be at various depths from the perspective of each respective contour 210*a-c*, similar to that described in the structural vector generation block 232. In certain embodiments, the mesh image vector 214 may be compared with each of the planes (e.g., xy plane, yz plane, and zx plane) and a color code 230 of each additional feature point 222 may be determined. In certain embodiments, the color code 230 of an additional feature point 222 may be determined based on the color code 228 of one or more neighboring feature points 226 as indicated in the baseline dataset 224 and/or color code of one or more neighboring feature points 216 indicated in the mesh image vector 214.

The output of the comparison operation may be a set of color code 230 of the determined additional feature points 222. For example, the machine learning module 150 may determine a histogram 234 of the reference image 102, where the histogram 234 is a 2D plot where the x-axis indicates the location coordinates of pixels or feature points 216 of the reference image 102 and the y-axis is the color code of the pixels or the feature points 216. In some embodiments, the histogram 234 may be a 2D plot where the x-axis indicates the location coordinates of pixels or feature points 226 and the y-axis is the color code 228 of the pixels or the feature points 226 as indicated in the baseline dataset 226. Based on the histogram 234, the image processing device 140 may determine the color code of the neighboring feature points 226, 216 and determine that the color code 230 of the additional feature point 222 may correspond to the same color code 230 as the neighboring feature points 226, 216. In this manner, the image processing device 140 may determine new color code 230 of newly determined additional feature points 222 in each iteration of the loop shown in the textural vector generation block 236.

In certain embodiments, the image processing device 140 may determine the set of color code 230 associated with regions between the feature points 216, 222. For example, the determined set of color code 230 may fill the areas between the feature points 216, 222.

The image processing device 140 may generate the textural vector 242 by adding or populating the textural vector 242 with the determined set of color code 230. For example, the image processing device 140 may generate an empty vector 242 and populate it with the already existing color code 217 as indicated in the mesh image vector 214 and the reference image 102 and in each iteration of the loop in the textural vector generation block 236 add newly identified color code 230 to the textural vector 242. The textural vector 242 may represent the color pallet or color code 217 of different regions of the object 106 shown in reference image 102 with the additional set of color code 230 of the additional feature points 222.

The image processing device 140 may generate a final 3D model 244 of the object 106. In this process, the image processing device 140 may generate an image vector 246 of the object 106 by combining the structural vector 240 and the textural vector 242. The final 3D model 244 may be represented by the image vector 246. In one example, the image vector 246 may be superimposed of the structural vector 240 and the textural vector 242. In another example, the image vector 246 may be a combination of the structural vector 240 and the textural vector 242. The final 3D model 244 may be referred to as a final model in the present disclosure.

In certain embodiments, determining an additional/intersecting feature point 222 where the mesh image vector 214 meets a contour 210*a-c* may be in response to determining an intersecting line where the mesh image vector 214 meets the contour 210*a-c*. For example, the image processing device 140 may determine a set of intersecting feature points 222 along the intersecting line where the mesh image vector 214 meets the contour 210*a-c*. The image processing device 140 may determine at least one of the set of intersecting feature points 222 corresponds to (or within a threshold distance from) a feature point 226 from the baseline dataset 224. In response, the image processing device 140 may further populate the structural vector 240 with at least one of the determined set of intersecting feature points 222. The image processing device 140 may determine a set of color code 230 associated with at least one of the determined sets of intersecting feature points 222, similar to that described above in the operations of the textural vector generation block 236. In response, the image processing device 140 may further populate the textural vector 242 with the determined set of color code 230.

Object Identification Using the Final 3D Model of the Object

The image processing device 140 may use the final model 244 for object detection, identification, and validation. For example, to determine whether the object 106 is the same object as test object 108, the image processing device 140 may perform the following operation. The image processing device 140 may access a test 3D image 104 of the object 108. The image processing device 140 may extract a set of features 272 from the test 3D image 104, e.g., by implementing an image processing, feature extraction neural network machine learning algorithm. The features 272 may represent the test 3D model 270 of the test 3D image 104. The features 272 may be represented by the feature vector 274 which comprises numerical values. The extracted features 272 may or may not be as detailed as the feature points of the object 106 included in the final model 244. For example, the final model 244 may have a higher granularity or resolution compared to the test model 270. The features 272 may represent physical attributes of the object 108, such as lines, edges, colors, etc. of different regions of the object 108.

The image processing device 140 may compare the image vector 246 with the features 272 (or the feature vector 274). If it is determined that more than a threshold number of feature points (e.g., that include the additional feature points 222 and the original feature points included in the mesh image vector 214 and/or the reference image 102) correspond to counterpart features 272, the image processing device 140 may determine that the object 106 is the same as the object 108. Otherwise, the image processing device 140 may determine that the object 106 is not the same as the object 108.

In certain embodiments, the image processing device 140 may determine whether the baseline dataset 224 comprises a second feature point 226 that is within a threshold distance from an intersecting/additional feature point 222. In response, the image processing device 140 may further populate the structure vector 240 with the second feature point 226. In certain embodiments, the image processing device 140 may determine a color code 228 associated with the second feature point 226 based on identifying the color code 228 associated with the second feature point 226 from the baseline dataset 224. In response, the image processing device 140 may further populate the textural vector 242 with the identified color code 228.

Method for Increasing the Resolution of a 3D Image by Detecting Additional Feature Points FIG. 3 illustrates an example flowchart of a method 300 for increasing the resolution of a 3D image 102 by detecting additional feature points 222. Modifications, additions, or omissions may be made to method 300. Method 300 may include more, fewer, or other operations. For example, operations may be performed in parallel or in any suitable order. While at times discussed as the system 100, image processing device 140, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 302-328.

At operation 302, the image processing device 140 determines a set of contours 210*a-c* from the first 3D image 102 of the first object 106. For example, the image processing device 140 may determine the contours 210*a-c* by implementing a contour detection image processing or image segmentation neural network algorithm.

At operation 304, the image processing device 140 determines the mesh image vector 214 from the contours 210*a-c*. For example, the image processing device 140 may feed the contours 210*a-c* to the merging function 212 to determine the mesh image vector 214, similar to that described in FIG. 2. At operation 306, the image processing device 140 compares the mesh image vector 214 with each of the contours 210*a-c*, similar to that described in FIG. 2.

At operation 308, the image processing device 140 determines an intersecting/additional feature point 222 where the mesh image vector 214 meets a contour 210*a-c*. For example, in this process, the image processing device 140 may perform operations similar to those described in conjunction with the structural vector generation block 232 described in FIG. 2.

At operation 310, the image processing device 140 determines that the baseline dataset 224 comprises a feature point 226 that corresponds to the determined intersecting/additional feature point 222. For example, the image processing device 140 may determine that the feature point 226 corresponds to the determined intersecting/additional feature point 222 if they are within a threshold distance from each other, similar to that described in FIG. 2. The image processing device 140 may iteratively determine one or more additional/intersecting feature point 222 based on each comparison between the mesh image vector 214 and each contour 210*a-c*, further based on the baseline dataset 224.

At operation 312, the image processing device 140 generates the structural vector 240 by populating the structural vector 240 with the determined intersecting/additional feature point 222. The image processing device 140 may iteratively add newly determined intersecting/additional feature points 222 to the structural vector 240 after each iteration of the loop in the block 232, similar to that described in FIG. 2.

At operation 314, the image processing device 140 determines a color code 230 associated with the determined intersecting/additional feature point 222. For example, the image processing device 140 may perform operations similar to that described in conjunction with the block 236 described in FIG. 2.

At operation 316, the image processing device 140 generates the textural vector 242 by populating the textural vector 242 with the determined color code 230. The image processing device 140 may iteratively add newly determined color code 230 to the textural vector 242 after each iteration of the loop in the block 236, similar to that described in FIG. 2. In certain embodiments, the operations of blocks 232 and 236 may be synchronized before, during, and/or after each iteration of the loops.

At operation 318, the image processing device 140 generates the image vector 246 by combing the structural vector 240 and the textural vector 242. At operation 320, the image processing device 140 extracts a set of features 272 from a test 3D image 104 of a second object 108. The set of features 272 may represent physical attributes of the second object 108 as shown in the test image 104.

At operation 322, the image processing device 140 compares the image vector 246 with the extracted set of features 272. For example, the image processing device 140 may determine a Euclidean distance between the image vector 246 and the feature vector 274.

At operation 324, the image processing device 140 determines whether the image vector corresponds to the feature vector 274 (that includes the extracted set of features 272). For example, if it is determined that more than a threshold number or percentage of the feature points 272 correspond to (or within a threshold range, e.g., within 0.1, 0.2 range, etc.) the counterpart feature points included in the vector 246, it may be determined that the image vector 246 corresponds to the feature vector 274. The threshold number may be one hundred, two hundred, etc. The threshold percentage may be 90%, 95%, etc. In another example, if the determined Euclidean distance between the image vector 246 and the feature vector 274 is less than a threshold distance (e.g., less 0.1, 0.2, etc.), it may be determined that the image vector 246 corresponds to the feature vector 274. If it is determined that the image vector 246 corresponds to the feature vector 274, method 300 proceeds to operation 326. Otherwise, method 300 proceeds to operation 328.

At operation 326, the image processing device 140 determines that the first object 106 is the second object 108. At operation 328, the image processing device 140 determines that the first object 106 is not the second object 108.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for increasing a resolution of a three-dimension (3D) image, comprising:
a memory configured to store:
a baseline dataset that comprises:
a first set of feature points that are known for a first category of objects, wherein the first set of feature points indicates physical attributes that are common among the first category of objects; and
a color code associated with each of the first set of feature points;
a first 3D image of a first object, wherein the first object belongs to the first category of objects;
a processor, operably coupled to the memory, and configured to:
determine a set of contours from the first 3D image, wherein each of the set of contours represents a boundary around the first object in a different two-dimension (2D) plane;
determine a mesh image vector that indicates a set of location coordinates of a second set of feature points on a surface of the first object, wherein the second set of feature points indicates physical attributes of the first object;
for at least a first contour from among the set of contours:
compare the mesh image vector with the first contour;
determine an intersecting feature point where the mesh image vector meets the first contour;
determine that the baseline dataset comprises a first feature point that corresponds to the intersecting feature point;
in response to determining that the baseline dataset comprises the first feature point that corresponds to the intersecting feature point, generate a structural vector by populating the structural vector with the intersecting feature point;
determine a first color code associated with the intersecting feature point based at least in part upon determining that the first feature point is associated with the first color code;
generate a textural vector by populating the textural vector with the first color code;
generate an image vector of the first object by combining the structural vector with the textural vector;
access a test 3D image of a second object;
extract a set of features from the test 3D image, wherein the set of features represents physical attributes of the second object shown in the test 3D image;
compare the image vector of the first object to the extracted set of features; and
determine that the first object is the second object in response to determining that more than a threshold percentage of feature points of the image vector corresponds to counterpart features of the extracted set of features.

2. The system of claim 1, wherein:
the set of contours comprises:
an xy plane contour that represents a first boundary around the first object in an xy plane;
a yz plane contour that represents a second boundary around the first object in a yz plane; and
a zx plane contour that represents a third boundary around the first object in a zx plane;
the first contour is any of the xy plane contour, the yz plane contour, or the zx plane contour.

3. The system of claim 1, wherein the processor is further configured to:
for at least the first contour from among the set of contours:
determine that the baseline dataset comprises a second feature point that is within a threshold distance from the intersecting feature point; and
in response to determining that the baseline dataset comprises the second feature point that is within the threshold distance from the intersecting feature point, further populate the structural vector with the second feature point.

4. The system of claim 3, wherein the processor is further configured to:
- determine a second color code associated with the second feature point based at least in part upon the baseline dataset; and
- further populate the textural vector with the second color code.

5. The system of claim 1, wherein the mesh image vector is determined by merging a set of vectors that represents the set of contours with each other.

6. The system of claim 1, wherein:
- determining the intersecting feature point where the mesh image vector meets the first contour is in response to determining an intersecting line where the mesh image vector meets the first contour; and
- the processor is further configured to:
  - determine a set of intersecting feature points along the intersecting line;
  - determine that at least one of the set of intersecting feature points corresponds to a feature point comprised in the baseline dataset;
  - further populate the structural vector with the at least one of the determined set of intersecting feature points;
  - determine a set of color code associated with the at least one of the determined set of intersecting feature points based at least in part upon the baseline dataset; and
  - further populate the textural vector with the determined set of color code.

7. The system of claim 1, wherein the first category of objects indicates humans or animals.

8. A method for increasing a resolution of a three-dimension (3D) image, comprising:
- storing a baseline dataset that comprises:
  - a first set of feature points that are known for a first category of objects, wherein the first set of feature points indicates physical attributes that are common among the first category of objects; and
  - a color code associated with each of the first set of feature points;
- storing a first 3D image of a first object, wherein the first object belongs to the first category of objects;
- determining a set of contours from the first 3D image, wherein each of the set of contours represents a boundary around the first object in a different two-dimension (2D) plane;
- determining a mesh image vector that indicates a set of location coordinates of a second set of feature points on a surface of the first object, wherein the second set of feature points indicates physical attributes of the first object;
- for at least a first contour from among the set of contours:
  - comparing the mesh image vector with the first contour;
  - determining an intersecting feature point where the mesh image vector meets the first contour;
  - determining that the baseline dataset comprises a first feature point that corresponds to the intersecting feature point;
  - in response to determining that the baseline dataset comprises the first feature point that corresponds to the intersecting feature point, generating a structural vector by populating the structural vector with the intersecting feature point;
  - determining a first color code associated with the intersecting feature point based at least in part upon determining that the first feature point is associated with the first color code;
  - generating a textural vector by populating the textural vector with the first color code;
- generating an image vector of the first object by combining the structural vector with the textural vector;
- accessing a test 3D image of a second object;
- extracting a set of features from the test 3D image, wherein the set of features represents physical attributes of the second object shown in the test 3D image;
- comparing the image vector of the first object to the extracted set of features; and
- determining that the first object is the second object in response to determining that more than a threshold percentage of feature points of the image vector corresponds to counterpart features of the extracted set of features.

9. The method of claim 8, wherein:
- the set of contours comprises:
  - an xy plane contour that represents a first boundary around the first object in an xy plane;
  - a yz plane contour that represents a second boundary around the first object in a yz plane; and
  - a zx plane contour that represents a third boundary around the first object in a zx plane;
- the first contour is any of the xy plane contour, the yz plane contour, or the zx plane contour.

10. The method of claim 8, further comprises:
- for at least the first contour from among the set of contours:
  - determining that the baseline dataset comprises a second feature point that is within a threshold distance from the intersecting feature point; and
  - in response to determining that the baseline dataset comprises the second feature point that is within the threshold distance from the intersecting feature point, further populating the structural vector with the second feature point.

11. The method of claim 10, further comprising:
- determining a second color code associated with the second feature point based at least in part upon the baseline dataset; and
- further populating the textural vector with the second color code.

12. The method of claim 8, wherein the mesh image vector is determined by merging a set of vectors that represents the set of contours with each other.

13. The method of claim 8, wherein:
- determining the intersecting feature point where the mesh image vector meets the first contour is in response to determining an intersecting line where the mesh image vector meets the first contour; and
- the method further comprises:
  - determining a set of intersecting feature points along the intersecting line;
  - determining that at least one of the set of intersecting feature points corresponds to a feature point comprised in the baseline dataset;
  - further populating the structural vector with the at least one of the determined set of intersecting feature points;

determining a set of color code associated with the at least one of the determined set of intersecting feature points based at least in part upon the baseline dataset; and further populating the textural vector with the determined set of color code.

14. The method of claim 8, wherein the first category of objects indicates humans or animals.

15. A non-transitory computer-readable medium storing instructions that when executed by a processor, cause the processor to:
store a baseline dataset that comprises:
a first set of feature points that are known for a first category of objects, wherein the first set of feature points indicates physical attributes that are common among the first category of objects; and
a color code associated with each of the first set of feature points;
store a first 3D image of a first object, wherein the first object belongs to the first category of objects;
determine a set of contours from the first 3D image, wherein each of the set of contours represents a boundary around the first object in a different two-dimension (2D) plane;
determine a mesh image vector that indicates a set of location coordinates of a second set of feature points on a surface of the first object, wherein the second set of feature points indicates physical attributes of the first object;
for at least a first contour from among the set of contours:
compare the mesh image vector with the first contour;
determine an intersecting feature point where the mesh image vector meets the first contour;
determine that the baseline dataset comprises a first feature point that corresponds to the intersecting feature point;
in response to determining that the baseline dataset comprises the first feature point that corresponds to the intersecting feature point, generate a structural vector by populating the structural vector with the intersecting feature point;
determine a first color code associated with the intersecting feature point based at least in part upon determining that the first feature point is associated with the first color code;
generate a textural vector by populating the textural vector with the first color code;
generate an image vector of the first object by combining the structural vector with the textural vector;
access a test 3D image of a second object;
extract a set of features from the test 3D image, wherein the set of features represents physical attributes of the second object shown in the test 3D image;
compare the image vector of the first object to the extracted set of features; and
determine that the first object is the second object in response to determining that more than a threshold percentage of feature points of the image vector corresponds to counterpart features of the extracted set of features.

16. The non-transitory computer-readable medium of claim 15, wherein:
the set of contours comprises:
an xy plane contour that represents a first boundary around the first object in an xy plane;
a yz plane contour that represents a second boundary around the first object in a yz plane; and
a zx plane contour that represents a third boundary around the first object in a zx plane;
the first contour is any of the xy plane contour, the yz plane contour, or the zx plane contour.

17. The non-transitory computer-readable medium of claim 15, wherein the instructions further cause the processor to:
for at least the first contour from among the set of contours:
determine that the baseline dataset comprises a second feature point that is within a threshold distance from the intersecting feature point; and
in response to determining that the baseline dataset comprises the second feature point that is within the threshold distance from the intersecting feature point, further populate the structural vector with the second feature point.

18. The non-transitory computer-readable medium of claim 17, wherein the instructions further cause the processor to:
determine a second color code associated with the second feature point based at least in part upon the baseline dataset; and
further populate the textural vector with the second color code.

19. The non-transitory computer-readable medium of claim 15, wherein the mesh image vector is determined by merging a set of vectors that represents the set of contours with each other.

20. The non-transitory computer-readable medium of claim 15, wherein:
determining the intersecting feature point where the mesh image vector meets the first contour is in response to determining an intersecting line where the mesh image vector meets the first contour; and
the instructions further cause the processor to:
determine a set of intersecting feature points along the intersecting line;
determine that at least one of the set of intersecting feature points corresponds to a feature point comprised in the baseline dataset;
further populate the structural vector with the at least one of the determined set of intersecting feature points;
determine a set of color code associated with the at least one of the determined set of intersecting feature points based at least in part upon the baseline dataset; and
further populate the textural vector with the determined set of color code.

* * * * *